United States Patent [19]
Humblet et al.

[11] Patent Number: 5,671,357
[45] Date of Patent: Sep. 23, 1997

US005671357A

[54] METHOD AND SYSTEM FOR MINIMIZING REDUNDANT TOPOLOGY UPDATES USING A BLACK-OUT TIMER

[75] Inventors: Pierre A. Humblet, Cambridge; Michael G. Hluchyj, Wellesley; Whay Chiou Lee, Cambridge; Robert Constantin, Newton, all of Mass.

[73] Assignee: Motorola, Inc., Schaumburg, Ill.

[21] Appl. No.: 708,109

[22] Filed: Sep. 6, 1996

Related U.S. Application Data

[63] Continuation of Ser. No. 282,682, Jul. 29, 1994, abandoned.

[51] Int. Cl.$^6$ .............................. G06F 13/00; H04L 29/02
[52] U.S. Cl. ........................... 395/200.11; 395/200.15; 395/200.02; 370/400
[58] Field of Search ........................... 370/94.1, 453, 370/457, 400; 395/DIG. 1, 200.15, 200.11, 200.1, 200.02

[56] References Cited

U.S. PATENT DOCUMENTS

| | | | |
|---|---|---|---|
| 4,644,532 | 2/1987 | George et al. | 370/94 |
| 4,825,206 | 4/1989 | Brice, Jr. et al. | 340/825.02 |
| 5,049,873 | 9/1991 | Robins et al. | 340/825.06 |
| 5,086,428 | 2/1992 | Perlman et al. | 370/94.1 |
| 5,295,183 | 3/1994 | Langlois et al. | 379/113 |
| 5,329,531 | 7/1994 | Diepstraten et al. | 370/94.2 |
| 5,412,654 | 5/1995 | Perkins | 370/94.1 |

*Primary Examiner*—Larry D. Donaghue
*Assistant Examiner*—Mark H. Rinehart
*Attorney, Agent, or Firm*—Darleen J. Stockley

[57] ABSTRACT

The method and system implement a black-out timer to schedule intermediate network topology updates in coordination with a predetermined periodic network topology update timer to minimize redundant topology updates. Topology update scheduling in accordance with the present invention provides a significant enhancement to the efficiency of topology updating.

6 Claims, 3 Drawing Sheets

---

DETERMINING, UPON OCCURENCE OF A NETWORK TOPOLOGY UPDATE EVENT, WHETHER THE NETWORK TOPOLOGY UPDATE EVENT IS A PREDETERMINED PERIODIC UPDATE EVENT, I.E., EXPIRATION OF A PREDETERMINED TIME, OR A SPECIAL UPDATE EVENT — 602

WHERE THE NETWORK TOPOLOGY UPDATE EVENT IS A PREDETERMINED PERIODIC UPDATE EVENT, STARTING THE PERIODIC TIMER AGAIN TO SCHEDULE THE NEXT PERIODIC UPDATE EVENT, SENDING A TRIGGER SIGNAL TO A TOPOLOGY BROADCASTER OF THE NODES TO INITIATE A NETWORK TOPOLOGY UPDATE AND RECYCLING TO WAIT FOR OCCURANCE OF ANOTHER NETWORK TOPOLOGY UPDATE EVENT — 604

WHERE THE NETWORK TOPOLOGY UPDATE EVENT IS A SPECIAL UPDATE EVENT, DETERMINING WHETHER A BLACK-OUT PERIOD FOR UPDATING NETWORK TOPOLOGY IS IN EFFECT AND ONE OF 1-2:

1) WHERE THE BLACK-OUT PERIOD IS IN EFFECT, I.E., THE BLACK-OUT TIMER IS RUNNING, RECYCLING TO WAITING FOR OCCURENCE OF ANOTHER NETWORK TOPOLOGY UPDATE EVENT; AND

2) WHERE THE BLACK-OUT PERIOD IS COMPLETED, I.E., THE BLACK-OUT TIMER IS IDLE, STARTING A BLACK-OUT TIMER TO BEGIN ANOTHER BLACK-OUT PERIOD AND SENDING A TRIGGER SIGNAL TO THE TOPOLOGY BROADCASTER OF THE NODE TO INITIATE A NETWORK TOPOLOGY UPDATE AND RECYCLING TO WAITING FOR OCCURENCE OF ANOTHER NETWORK TOPOLOGY UPDATE EVENT — 606

*600*

METHOD AND SYSTEM FOR MINIMIZING REDUNDANT TOPOLOGY UPDATES USING A BLACK-OUT TIMER

This is a continuation of application Ser. No. 08/282,682, filed Jul. 29, 1994 and now abandoned.

FIELD OF THE INVENTION

The present invention relates in general to network topology for establishing communication between nodes of a communication network, and more particularly, to updating of network topology by means of topology broadcasts.

BACKGROUND

In a communication network consisting of nodes representing switching systems and links representing transmission facilities between pairs of nodes, the network topology, i.e., the collection of all link state information, is maintained by each node that is responsible for path computation for establishing communication between nodes. A routing protocol is used to determine an appropriate path for each connection establishment. Dynamic routing protocols may be broadly divided into two classes: link state protocols and distance vector protocols. Link state protocols maintain the state information of all the relevant links. Distance vector protocols maintain a vector of distances from the home node to all other nodes. In both cases, the routing information must be kept up to date to avoid call blocking and erroneous path selection.

Dynamic routing algorithms have many subtle design and implementation issues. Due to changes in the network, the topology must be updated from time to time via a topology broadcast mechanism. A topology broadcast is an event executed by a node such that a message, containing routing information, is advertised or distributed to all other nodes in the network. Traditionally, topology broadcast algorithms make use of periodic updates and/or event-driven, e.g., link up/down, capacity change, updates. Periodic topology updates require a timer that needs to be tuned: this is an especially difficult issue in large networks because of the trade-off between timely topology information and efficient updates. Event-driven topology updates suffer from redundant updates caused by events such as link resource depletion.

Thus, there is a need for a method and system of minimizing redundant topology updates to provide current network topology in an efficient manner.

DETAILED DESCRIPTION OF A PREFERRED EMBODIMENT

Figure 1:
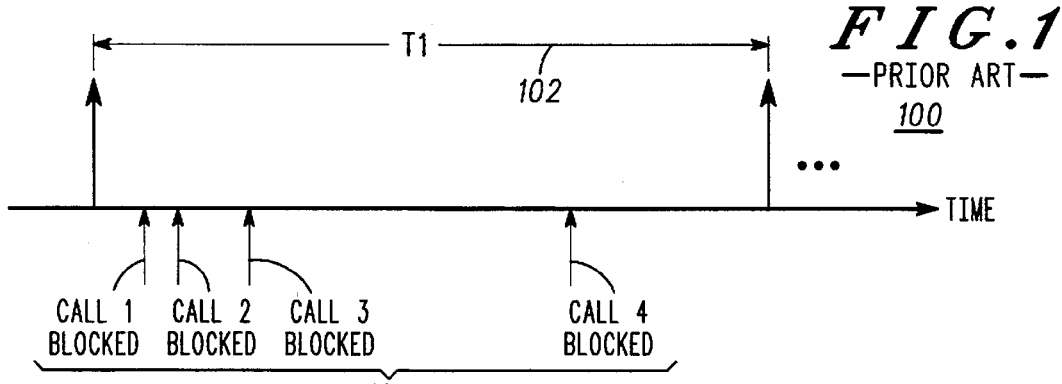
FIG. 1 is a schematic of an example of a typical period for periodic topology updates.

With periodic updates, topology update performance depends very much on the appropriate length of the update period. If the period is too large, the latency in topology updates can lead to considerable resource contention. If the period is too small, the resources needed to support topology updates can be excessive. FIG. 1, numeral 100, shows a schematic of a typical period for periodic topology updates. The length of the period (102) is denoted T1. A timer with period T1 is started whenever there is a periodic topology update. The next update is triggered when the timer expires. Between consecutive updates, events (104) may arrive. In the example shown in FIG. 1, four events that lead to call blocking arrive within the period. The first blocked call may have been blocked because a given resource is depleted. The subsequent three blocked calls might have been spared their blocking had there been a topology update immediately after the first call blocking event.

Figure 2:
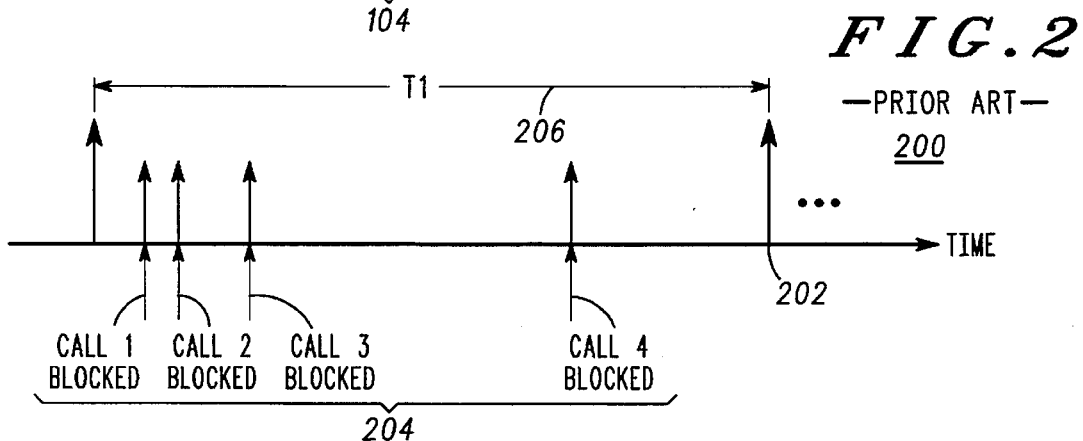
FIG. 2 is a schematic of an example of a typical period for periodic and event-driven updates.

With event-driven updates, topology update performance depends very much on the arrival characteristics of the events. If the events arrive regularly in time, the performance is similar to the case with periodic updates. If the events arrive in a bursty manner, the performance varies with time. When there are long idle periods, topology updates are infrequent, and should there be any unspecified event that changes the topology, such a change will not be updated in a timely manner. When there are many arrivals within a short time, many of the updates may be redundant. FIG. 2, numeral 200, is a schematic of an example of a typical period for periodic and event-driven updates. Topology updates are triggered not only by the expiration (202) of the periodic timer having period T1 (206), which may be considered as an event by itself, but also by the arrival of special events (204) due to dynamic network factors. In this example, the special events (204) are those that lead to call blocking.

Figure 3:
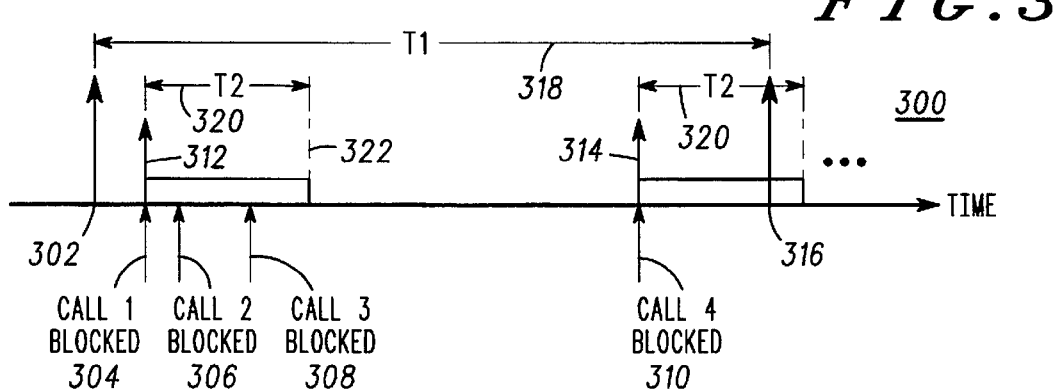
FIG. 3 is a schematic showing a timing sequence for scheduling network topology updates in accordance with the method of the present invention.

FIG. 3, numeral 300, is a schematic showing a timing sequence for scheduling network topology updates in accordance with the method of the present invention. In the example of FIG. 3 the following sequence of events and topology updates occur: a periodic timer with period T1 (318) is started, and at the same time a topology update is initiated (302); a first call, call 1, is blocked (304), thus triggering a topology update and a black-out timer (312) with period T2 (320) to be started; second and third calls, call 2 and call 3, are blocked (306, 308), but since the blocking occurs within the period T2 initiated by the blocking of call 1, no further topology updating is initiated; the black-out timer expires (322); a fourth call, call 4, is blocked (310), thus triggering another topology update and the black-out timer (314) with period T2 (320) to be started again; and at the end of the predetermined time interval T1 (318), the periodic timer expires, and another topology update is initiated while the periodic timer is started again (316). Though the second T2 interval is shown to extend beyond the first T1 interval, i.e., the interval that begins at element 314 extends beyond element 316, it is clear that the second T2 interval may fall entirely within the first T1 interval, straddle the first T1 interval, or may occur beyond the first T1 interval. The periodically triggered topology updates are not affected by the black-out timer.

Thus, the present invention utilizes a topology update black-out timer, operably coupled to a periodic timer, in a network communication system for scheduling topology updates to synchronize topology information stored in topology databases of network nodes. The method of the present invention maximizes performance of a topology update mechanism by using a combination of periodic and event-driven update triggers. Although, in the following description, only events that lead to call blocking are described, the method is easily extendable to include other events.

Figure 4:
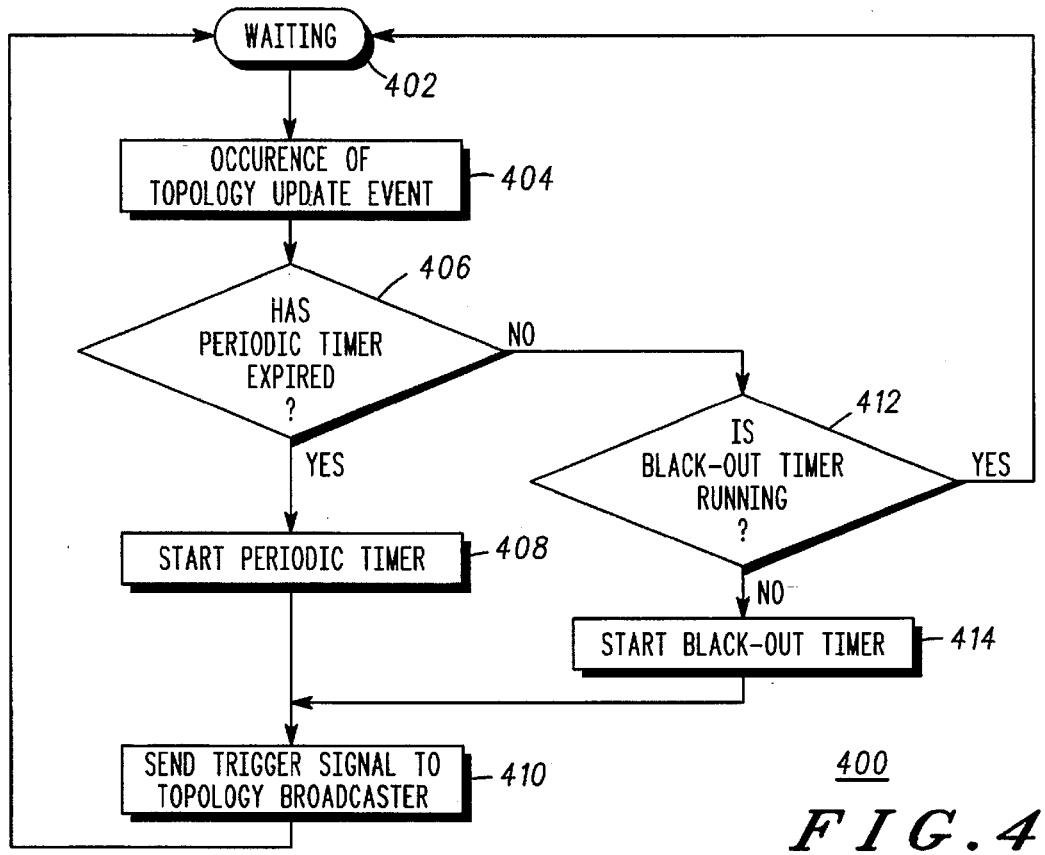
FIG. 4 is a flow chart of the steps for the method of providing a topology update timing sequence in accordance with the method of the present invention.

A flow chart of the steps for the method of providing a topology update timing sequence in accordance with the method of the present invention is shown in FIG. 4, numeral 400. The method utilizes the fact that when many events that trigger topology updates arrive in a burst, many of the updates triggered do not provide additional useful information about the topology. To avoid redundant updates, a "black-out" period is inserted following any update that is triggered by a special event. During the "black-out" period no additional updates may be triggered by special events. Periodically triggered updates are, however, allowed to be executed as usual, so that no consecutive updates are separated by more than the update period T1. The method includes the steps of: A) determining, upon occurrence of a network topology update event (404), whether the network topology update event is a predetermined periodic update event, i.e., expiration of a predetermined timer (406), or a special update event; B) where the network topology update event is a predetermined periodic update event, starting the periodic timer again to schedule a next periodic update event (408), sending a trigger signal to a topology broadcaster of the nodes to initiate a network topology update (410) and recycling to waiting for occurrence of another network topology update event; C) where the network topology update event is a special update event, determining whether a black-out period for updating network topology is in effect (412) and one of C1–C2: C1) where the black-out period is in effect, i.e., the black-out timer is running, recycling to waiting for occurrence of another network topology update event (402); and C2) where the black-out period is completed, i.e., the black-out timer is idle, starting a black-out timer (414) to begin another black-out period and sending a trigger signal to the topology broadcaster of the node to initiate a network topology update (410) and recycling to waiting for occurrence of another network topology update event (402).

Figure 5:
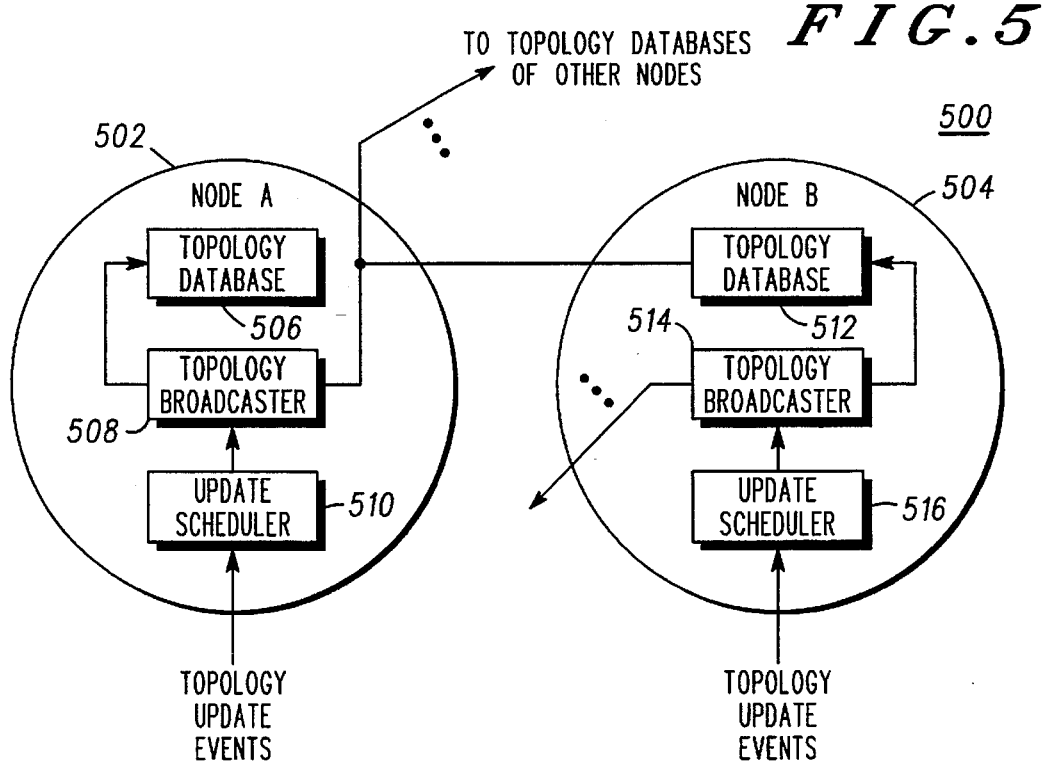
FIG. 5 is a block diagram of a system in accordance with the present invention.

FIG. 5, numeral 500, is a block diagram of a system for implementing the method of the present invention at a node in a communication network consisting of a plurality of nodes representing switching systems and links representing transmission facilities between pairs of nodes, illustrated using two nodes: Node A and Node B. Each node has several components that are involved in topology updates: a) a topology database for storing topology information; b) an update scheduler for determining the schedule for triggering topology updates; c) a topology broadcaster, operationally coupled to the update scheduler, for transmitting timely topology information to its local topology database as well as the topology databases of all other nodes, upon receiving a trigger signal from the updates scheduler. FIG. 5 also shows the flow of signals during a topology update from Node A. When an update from Node A is required using the method of the present invention, the update scheduler (510) of Node A transmits a trigger signal to the topology broadcaster (508) of Node A. Upon receiving the trigger signal, the topology broadcaster (508) of Node A transmits the current topology information to the topology databases in all nodes, including that in Node A itself, to update the topology databases of the nodes. Nodes A (502) and B (504) are shown, but it is clear that a plurality of nodes are utilized. Each of the network nodes of the system includes an update scheduler (510, 516, ...), a topology broadcaster (508, 514, ...) and a topology database (506, 512, ...). The update scheduler (510, 516, ...), is used for determining, upon occurrence of a network topology update event, whether the network topology update event is a predetermined periodic update event or a special update event, and, where the network topology update event is a predetermined periodic update event, for starting the periodic timer again to schedule the next periodic update event and sending a trigger signal to a topology broadcaster of the node to initiate a network topology update and recycling to waiting for occurrence of another network topology update event, and where the network topology update event is a special update event, for determining whether a black-out period for updating network topology is in effect and one of a–b: a) where the black-out period is in effect, i.e., the black-out timer is running, for recycling to waiting for occurrence of another network topology update event; and b) where the black-out period is completed, i.e., the black-out timer is idle, for starting a black-out timer to begin another black-out period and for sending a trigger signal to the topology broadcaster of the node to initiate a network topology update and recycling to waiting for occurrence of another network topology update event. The topology broadcaster (508, 514 ...) is operably coupled to the update scheduler and is used for, upon receiving the trigger signal from the update scheduler, providing network topology update information to topology databases of all the nodes. The topology database (506, 512 ...) of a node is operably coupled to the topology broadcaster and is used for storing the network topology information. The black-out period is typically a predetermined time T2, where T2 is less than the predetermined period of time T1. The special update event may be a call blocking event.

Figure 6:
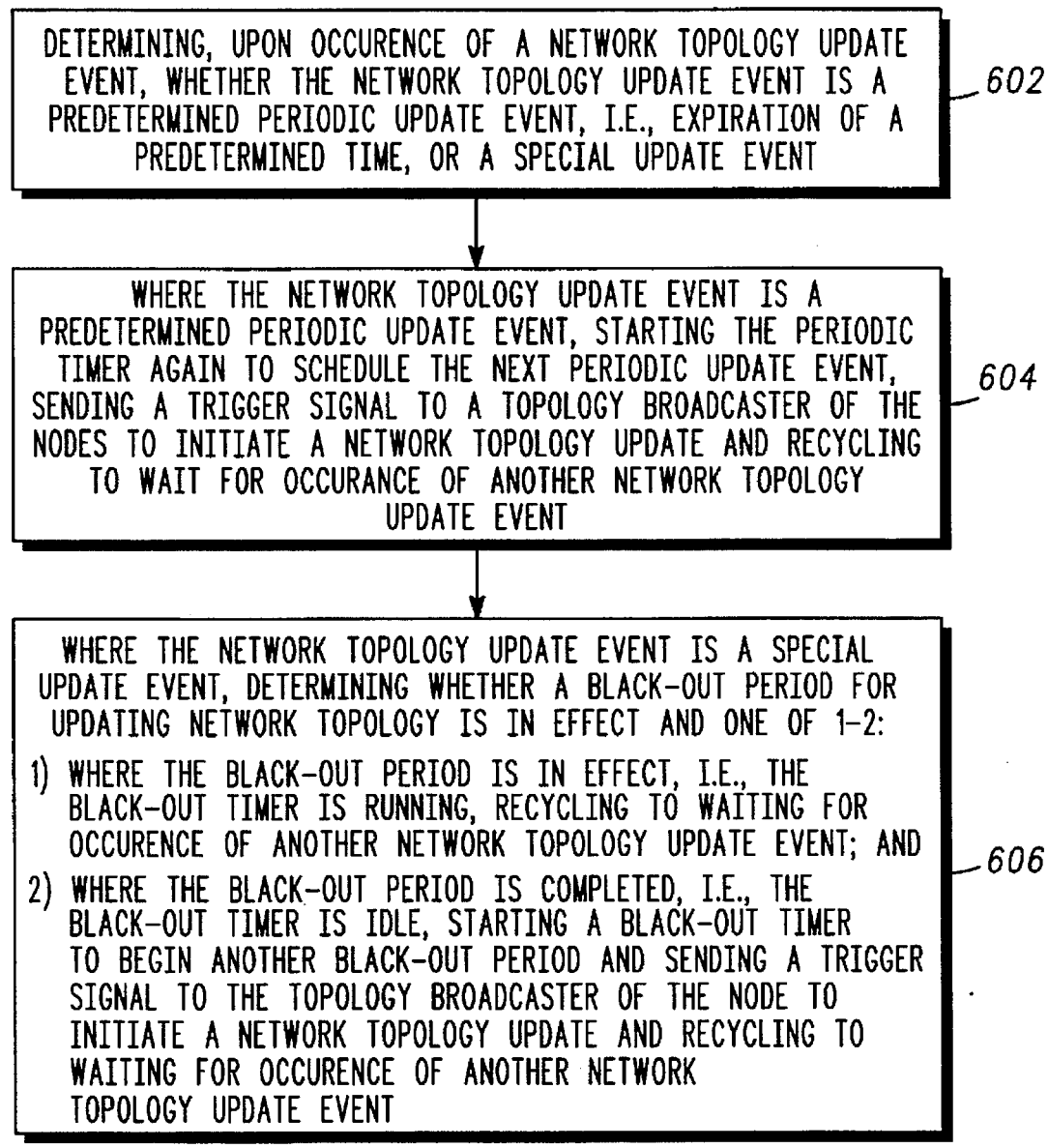
FIG. 6 is a flow chart showing steps of another embodiment of a method for minimizing redundant network topology updates in a communication network consisting of nodes representing switching systems and links representine transmission facilities between pairs of nodes in accordance with the present invention.

FIG. 6, numeral 600, is a flow chart showing steps of another embodiment of a method for minimizing redundant network topology updates in a communication network consisting of nodes representing switching systems and links representing transmission facilities between pairs of nodes in accordance with the present invention. The method includes the steps of: A) determining, upon occurrence of a network topology update event, whether the network topology update event is a predetermined periodic update event, i.e., expiration of a predetermined periodic timer or a special update event (602); B) where the network topology update event is a predetermined periodic update event, starting the periodic timer again to schedule a next periodic update event, sending a trigger signal to a topology broadcaster of the node to initiate a network topology update and recycling to waiting for occurrence of another network topology update event (604); C) where the network topology update event is a special update event, determining whether a black-out period for updating network topology is in effect (606) and one of C1–C2: C1) where the black-out period is in effect, i.e., the black-out timer is running, recycling to waiting for occurrence of another network topology update event (608); and C2) where the black-out period is completed, i.e., the black-out timer is idle, starting a black-out timer to begin another black-out period and sending a trigger signal to the topology broadcaster of the node to initiate a network topology update and recycling to waiting for occurrence of another network topology update event (610). Where the black-out period is a predetermined time T2, typically T1 is preselected to be greater than T2. The special update events may include call-blocking events or may be determined by dynamic network factors.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for minimizing redundant network topology updates in a communication network consisting of nodes representing switching systems and links representing transmission facilities between pairs of nodes, the method comprising the steps of:

A) determining, upon occurrence of a network topology update event, whether the network topology update event is a predetermined periodic update event;

B) where the network topology update event is a predetermined periodic update event, starting the periodic timer again to schedule a next periodic update event, sending a trigger signal to a topology broadcaster of the nodes to initiate a network topology update and recycling to waiting for occurrence of another network topology update event;

C) where the network topology update event is a special update event, determining whether a black-out period for updating network topology is in effect and a one of C1–C2:

C1) where the black-out period is in effect, recycling to waiting for occurrence of another network topology update event; and C2) where the black-out period is completed, starting a black-out timer to begin another black-out period and sending a trigger signal to the topology broadcaster of the node to initiate a network topology update and recycling to waiting for occurrence of another network topology update event, wherein the black-out period is a predetermined time T2, and a predetermined period of time T1 is selected for a periodic topology update wherein T1 is greater than the predetermined time T2, and wherein special update events include call-blocking events and an event-driven topology update is triggered each time a call setup fails.

2. A system for minimizing redundant network topology updates in a communication network consisting of a plurality of network nodes representing switching systems and links representing transmission facilities between pairs of nodes, each of the network nodes of the system comprising:

A) an update scheduler, for determining, upon occurrence of a network topology update event, whether the network topology update event is a predetermined periodic update event, and, A1) where the network topology update event is a predetermined periodic update event, for starting the predetermined timer again to schedule a next periodic update event, sending a trigger signal to a topology broadcaster of the node to initiate a network topology update and recycling to waiting for occurrence of another network topology update event;

A2) where the network topology update event is a special update event, for determining whether a black-out period for updating network topology is in effect and a one of A2a–A2b:

A2a) where the black-out period is in effect, for recycling to waiting for occurrence of another network topology update event; and A2b) where the black-out period is completed, for starting a black-out timer to begin another black-out period and for sending a trigger signal to the topology broadcaster of the node to initiate a network topology update and recycling to waiting for occurrence of another network topology update event;

B) the topology broadcaster, operably coupled to the update scheduler, for, upon receiving the trigger signal from the update scheduler, providing network topology update information to topology databases of all the nodes; and C) the topology database, operably coupled to the topology broadcaster, for storing the network topology update information, wherein the black-out period is a predetermined time T2, and a predetermined period of time T1 is selected for a periodic topology update wherein T1 is greater than the predetermined time T2, and wherein special update events include call-blocking events and an event-driven topology update is triggered each time a call setup fails.

3. A method for minimizing redundant network topology updates in a communication network consisting of nodes representing switching systems and links representing transmission facilities between pairs of nodes, wherein network topology consists of link states which are used for path selection, and redundant updates are performed upon a burst arrival of topology update triggers notwithstanding a slowly changing topology, and the method comprising the steps of:

A) determining, upon occurrence of a network topology update event, whether the network topology update event is a predetermined periodic update event, i.e., expiration of a predetermined timer, or a special update event;

B) where the network topology update event is a predetermined periodic update event, starting the periodic timer again to schedule a next periodic update event, sending a trigger signal to a topology broadcaster of the nodes to initiate a network topology update and recycling to waiting for occurrence of another network topology update event;

C) where the network topology update event is a special update event, determining whether a black-out period for updating network topology is in effect and one of C1–C2:

C1) where the black-out period is in effect, i.e., the black-out timer is running, recycling to waiting for occurrence of another network topology update event; and C2) where the black-out period is completed, i.e., the black-out timer is idle, starting a black-out timer to begin another black-out period and sending a trigger signal to the topology broadcaster of the node to initiate a network topology update and recycling to waiting for occurrence of another network topology update event, wherein the black-out period is a predetermined time T2, and a predetermined period of time T1 is selected for a periodic topology update wherein T1 is greater than the predetermined time T2.

4. The method of claim 3 wherein the special update events include call blocking events, such that an event-driven topology update is triggered each time a call setup fails.

5. A system for minimizing redundant network topology updates in a communication network consisting of a plurality of network nodes representing switching systems and links representing transmission facilities between pairs of nodes, wherein network topology consists of link states which are used for path selection, and redundant updates are performed upon a burst arrival of topology update triggers notwithstanding a slowly changing topology, and each of the network nodes of the system comprising:

A) an update scheduler, for determining, upon occurrence of a network topology update event, whether the network topology update event is a predetermined periodic update event, i.e., expiration of a predetermined timer, or a special update event, and, A1) where the network topology update event is a predetermined periodic update event, for starting the predetermined timer again to schedule a next periodic update event, sending a trigger signal to a topology broadcaster of the node to initiate a network topology update and recycling to waiting for occurrence of another network topology update event;

A2) where the network topology update event is a special update event, for determining whether a black-out period for updating network topology is in effect and one of A2a–A2b:

A2a) where the black-out period is in effect, i.e., the black-out timer is running, for recycling to waiting for occurrence of another network topology update event; and A2b) where the black-out period is completed, i.e., the black-out timer is idle, for starting a black-out timer to begin another black-out period and for sending a trigger signal to the topology broadcaster of the node to initiate a network topology update and recycling to waiting for occurrence of another network topology update event;

B) the topology broadcaster, operably coupled to the update scheduler, for, upon receiving the trigger signal from the update scheduler, providing network topology update information to topology databases of all the nodes; and C) the topology database, operably coupled to the topology broadcaster, for storing the network topology update information, wherein the black-out period is a predetermined time T2, and the predetermined period of time T1 is selected for a periodic topology update wherein T1 is greater than the predetermined time T2.

6. The system of claim 5 wherein the special update event is a call-blocking event, such that an event-driven topology update is triggered each time a call setup fails.

* * * * *